June 8, 1937.  B. MILLER  2,083,520
GAS ANALYZING PROCESS AND APPARATUS
Filed Jan. 4, 1933    2 Sheets-Sheet 1
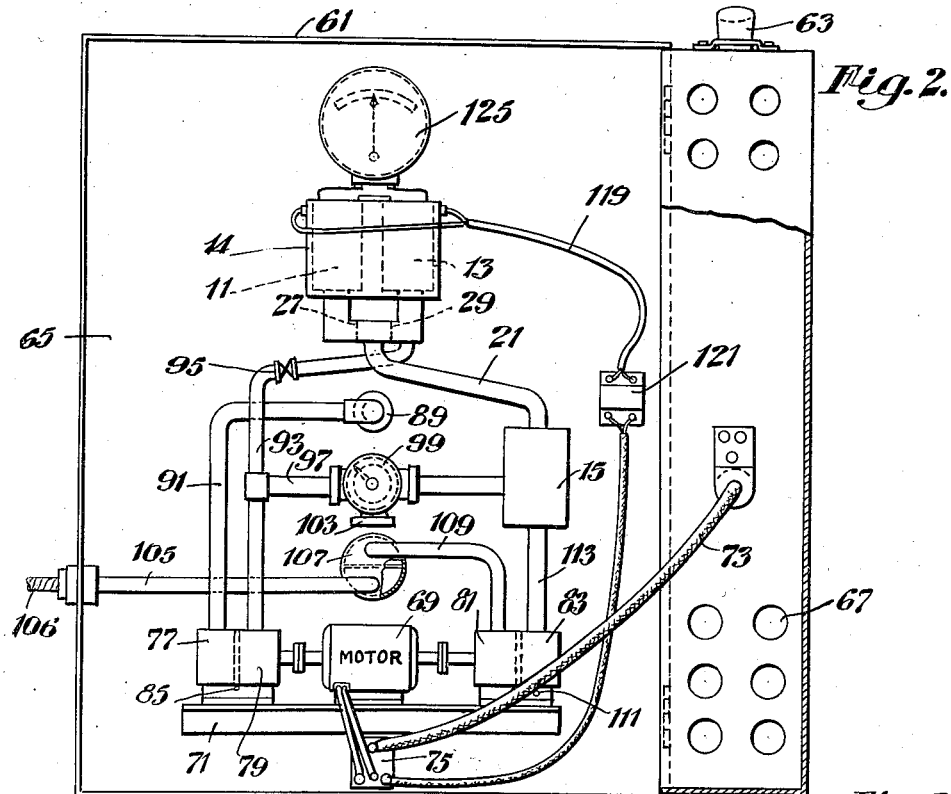
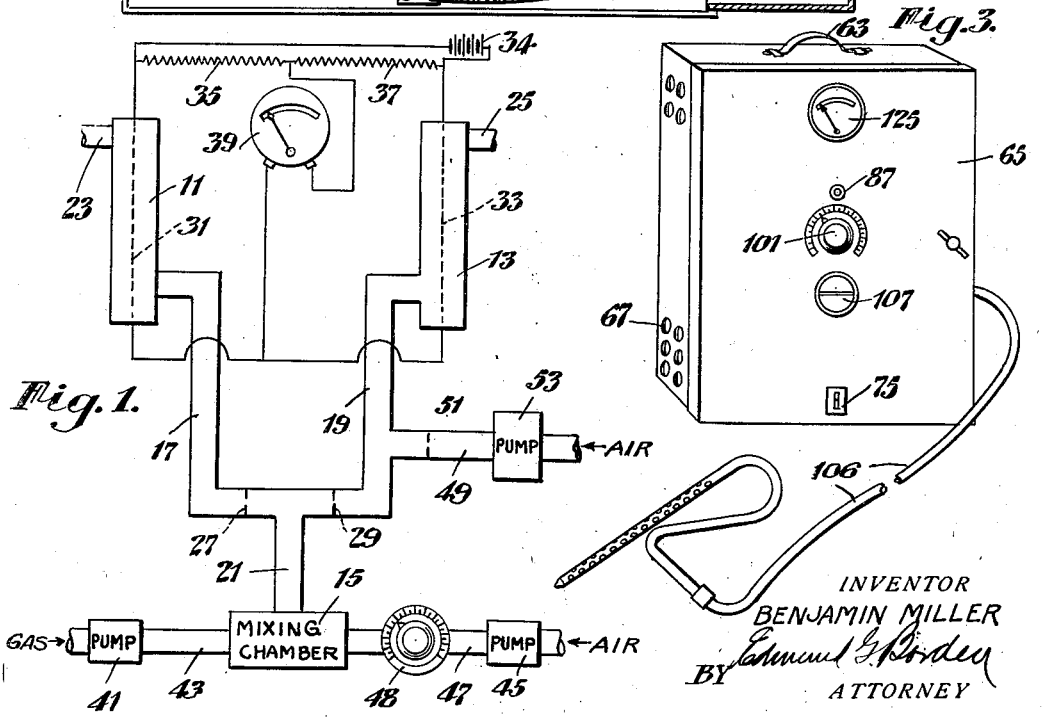
INVENTOR
BENJAMIN MILLER
BY
ATTORNEY June 8, 1937.   B. MILLER   2,083,520
GAS ANALYZING PROCESS AND APPARATUS
Filed Jan. 4, 1933   2 Sheets-Sheet 2
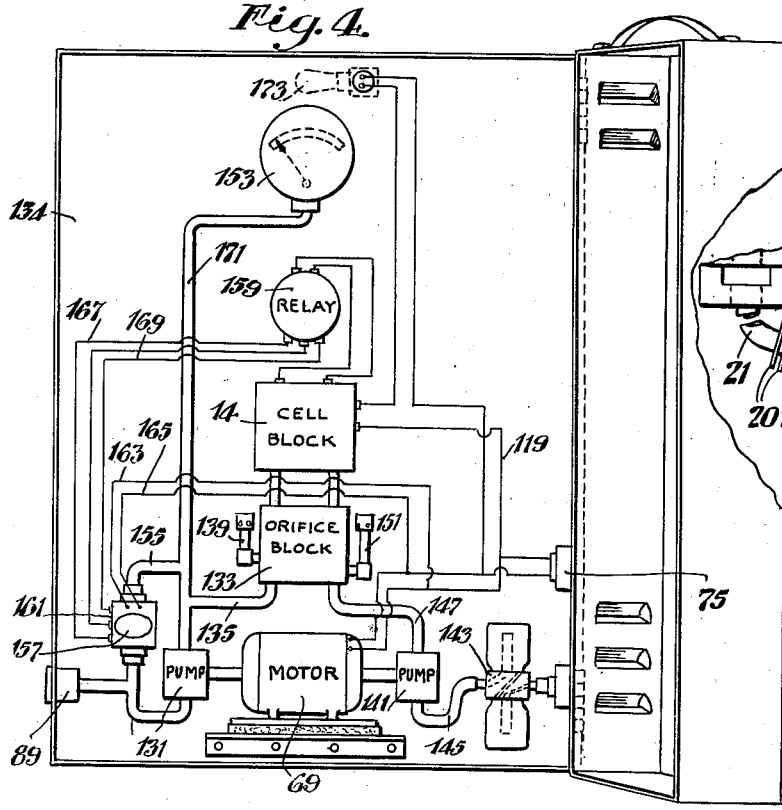
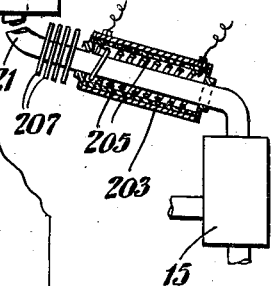
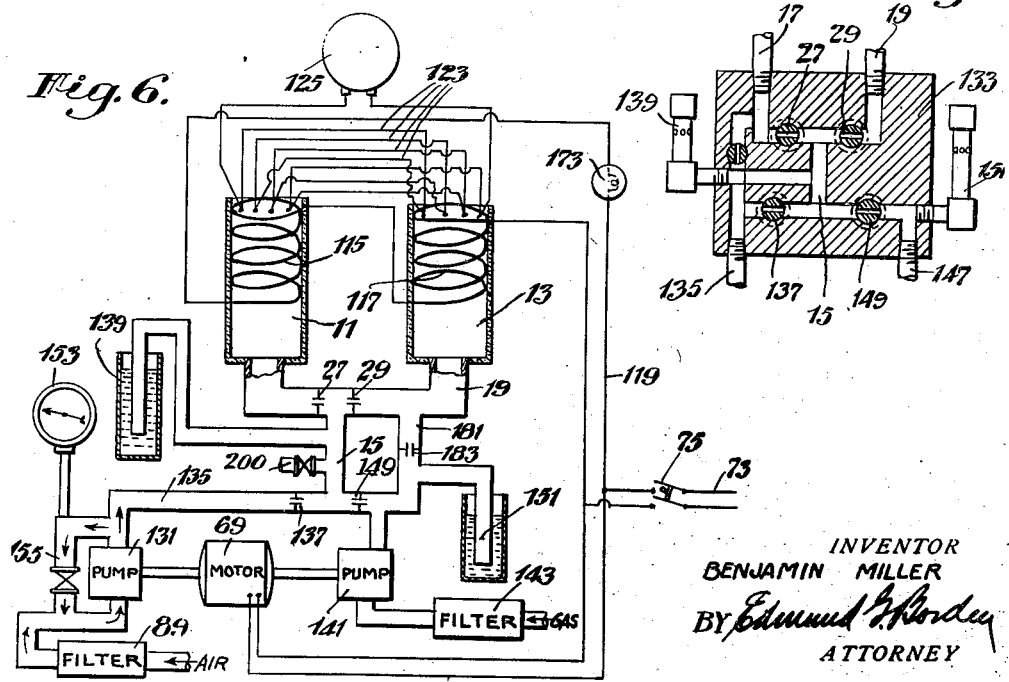
INVENTOR
BENJAMIN MILLER
BY Edmund F. Borden
ATTORNEY Patented June 8, 1937

2,083,520

UNITED STATES PATENT OFFICE 2,083,520

GAS ANALYZING PROCESS AND APPARATUS

Benjamin Miller, Richmond Hill, N. Y., assignor to Power Patents Company, Jersey City, N. J., a corporation of Maine Application January 4, 1933, Serial No. 650,133

15 Claims. (Cl. 23—232)

This invention relates to the quantitative measurement of the reactive components of gaseous mixtures such as those produced in various domestic and industrial combustion operations. It has especial utility in connection with the measurement of combustibles in the exhaust gases from an internal combustion engine of the automotive type, which are in the form of reducing gases,—produced under conditions of underventilation.

Many methods are already known for the measurement of the combustible components of various combustion gases following their admixture with an additional reactant, generally in the form of air. In such prior methods, a heated catalytic element was disposed within a combustion cell located in the path of the gas mixture for completing the combustion of combustibles therein. The resultant temperature increase was then measured electrically, generally employing a Wheatstone bridge circuit having therein the said catalytic element and a potentiometer.

The above methods have certain objectionable features inherent therein which interfere to some extent with their satisfactory commercial use. The catalytic element,—usually in the form of a fine filament,—is subject to mechanical deterioration and loss of its catalytic properties with continued use, due to such factors as the presence in the gas stream flowing around it of certain amounts of unburned hydrocarbons and the deposit upon it of slight films of carbon and,—under some conditions,—of moisture and other vapors. Furthermore where the catalytic combustion produces excessively high temperatures, partial volatilization of the filament may occur. The resultant deterioration of the filament acts to destroy the calibration of the instrument containing it. Obviously unless the instrument is more or less frequently recalibrated, the accuracy of the readings at times may be open to question. Furthermore in view of the gradual filament deterioration in use, it has been necessary heretofore to employ a rheostat in the Wheatstone bridge circuit for balancing the current flowing through the combustion cell at the beginning of the respective tests to compensate for these variations in the electric resistance of the filament.

Another essential feature of these prior processes was the need for maintaining at all times a uniform flow of the gas mixture being combusted within the catalytic cell, since variations in the flow rate had an important effect upon the resultant galvanometer readings.

The present invention overcomes these difficulties inherent in the prior art methods and apparatus for combustion gas measurement, and insures the permanency of the calibration of the measuring instrument.

Among the more important objects of the present invention are:

To provide in connection with combustion efficiency measurements based upon the controlled combustion of a gas mixture,—for making accurate combustion efficiency measurements independently of the rate of flow of the gases over a heated element;

To provide a combustion efficiency indicator which will have a substantially permanent calibration throughout its period of use;

To provide novel apparatus for measuring the efficiency of a combustion operation employing a heating element in an electric circuit, in connection with which the need for current balancing means has been eliminated;

To provide in novel manner for maintaining the accuracy of a combustion efficiency measuring device independently of the presence of unburned hydrocarbon vapors or water vapor in the gases being measured;

To provide in novel manner for prolonging the effective life of a catalytic element associated with a gas analyzer operating on the combustion principle; and To provide a novel combustion measuring instrument which is completely automatic.

These and other objects will be evident from a review of the following specification and claims.

In its broadest scope, the invention relates to a method and apparatus for determining the amount of a fluid reagent that is equivalent to one or more components of a unit quantity of a fluid mixture under examination. Although in the following description the fluid mixture being examined is indicated as the exhaust gases from an internal combustion engine of the automotive type, the invention obviously is not limited thereto. For instance, the fluid mixture being measured may be the flue gases from a furnace, in which case the component to be measured may be the excess oxygen in the flue gases,—and the reagent employed may be a combustible gas such as hydrogen.

In the somewhat more limited field of the measurement of the efficiency of combustion operations carried out under conditions of underventilation, the invention involves the preparation of a mixture of the gases to be analyzed with air, oxygen, or other suitable combustion-supporting reagent. The said fluid mixture is divided into two streams which preferably are equal in mass but this is not essential as long as the two portions are maintained in the same proportions. To one of the said portions of the fluid mixture is added a relatively small regulated amount of the gases to be analyzed or of a combustion-supporting fluid, as air, the amount thereof essentially being very small in comparison to the amount previously present in the gas-air mixture.

These two portions of the fluid mixture are then simultaneously passed into contact respectively with two highly heated elements, disposed in separate but similar combustion cells. Combustion thereby occurs in the respective cells, generating heat unequally in the latter. Visual evidence of the said heat unbalance of the cells is indicated in various ways, as by means of thermocouples disposed in the cells, or by having the said elements within the respective cells arranged in the usual Wheatstone bridge circuit. Thereafter, by the controlled variation of the quantity of combustion-supporting fluid, the temperatures produced within the respective cells are balanced. The amount of the combustion-supporting fluid present in the mixture when the said heat balance is secured is measured by a previously-calibrated device, as hereinafter will be more fully described.

Referring now to the accompanying drawings which illustrate important features of the invention:

Fig. 1 illustrates diagrammatically apparatus embodying the invention;

Fig. 2 is a rear elevation of an instrument panel showing one form of apparatus embodying the invention;

Fig. 3 is a front elevation of the device shown in Fig. 2, on a somewhat reduced scale;

Fig. 4 is an elevation of another modification of the invention;

Fig. 5 is a vertical section through an orifice block;

Fig. 6 illustrates somewhat diagrammatically still another modification of the invention; and Fig. 7 illustrates diagrammatically one feature of the invention.

Referring more particularly to Fig. 1, numerals 11, 13 designate similar hollow tubular combustion cells, having their respective lower ends connected with a mixing chamber 15, by means of the conduits 17, 19, and 21. The cells 11, 13 have gas outlets 23, 25 at their respective upper ends. The conduit 17 has a fixed orifice 27 therein; and the conduit 19 has a fixed orifice 29 therein,—the orifices 27, 29 being so constructed that the rate of gas flow through the conduits 17, 19 from conduit 21 is identical, or is uniformly proportional at all times.

Secured within the cells 11, 13, respectively are corresponding elements in the form of filaments 31, 33 of refractory metal which may have catalytic properties or may be catalytically inert. Examples of such metals are platinum and gold respectively. It is preferred to use rhodium, or platinum, or platinum-rhodium alloys. In the form shown in Fig. 1 these filaments form the variable legs of a Wheatstone bridge circuit, the latter having therein the fixed resistance elements 35, 37, and a galvanometer 39.

For producing a flow of the gas mixture through the cells 11, 13,—a pump 41,—adapted to withdraw the combustible gases to be examined from a source thereof,—is connected with chamber 15 through conduit 43; and a pump 45,—adapted to draw air or other suitable reactant from a suitable supply,—is connected with the chamber 15 through conduit 47. A calibrated valve 48 is disposed in the conduit 47 and is adapted to adjust the amount of air flowing to the chamber 15 during operation of the pump 45.

For supplying to the gas-air mixture flowing through cell 13 a small additional increment of air or its equivalent over that present in the gas-air mixture supplied to the cell 11,—a conduit 49 having therein a fixed orifice 51 is connected with the conduit 19 beyond the orifice 29 in the latter. A pump 53 is adapted to force the small increment of air through conduit 19 from a source of supply. In the practice of the invention according to Fig. 1, the exhaust gases are fed at a constant rate to mixing chamber 15 by pump 41. Simultaneously air is forced into chamber 15 in regulated amount by pump 45. The resultant mixture of air and exhaust gases continuously flows from the mixing chamber to the respective conduits 17, 19, preferably in substantially equal amounts, through the respective orifices 27, 29. A small additional amount of air is then added to the gas mixture in the conduit 19 by means of the pump 53 and orifice 51. The quantity of air added through the conduit 49 is extremely small compared to the maximum quantity of air which may be introduced to the system by the pump 45, and may for example be from .5 per cent to 5. per cent thereof, depending upon the accuracy desired. The gas-air mixtures in the conduits 17, 19 then flow through the respective cells 11, 13, where they come in contact with the highly heated elements in the said cells, thereby effecting combustion at the surface of the elements in well known manner. The elements 31, 33 are heated by a current flowing thereto from a battery or the like 34 to a temperature which insures combustion when combustibles and air are present in the gas mixture contacting therewith.

In calibrating the instrument, it is preferred to have one of the orifices 27, 29 fixed and the other adjustable. A gas-air mixture is passed through the mixing chamber and is then combusted in cells 11, 13,—no auxiliary air being used. The adjustable orifice is then regulated to balance the heating conditions within the respective cells. Auxiliary air is then used during subsequent calibration of the instruments.

In the event that the quantity of oxygen in the gas-air mixture leaving the mixing chamber 15 is substantially less than that required to combine with all of the combustibles present, then the energy liberated as heat in 13 will be greater than the energy liberated in 11. The electrical resistance of the element 33 will be greater than that of element 31, and a current will flow through the galvanometer causing the galvanometer needle to move to the left. The operator, noting this, adjusts the valve 48 to increase the flow of air to the mixing chamber.

When the quantity of oxygen in the gas-air mixture has increased until it is almost equivalent to the combustible gas present in the mixture, the excess energy liberated in cell 13 over that liberated in cell 11, will be just sufficient to compensate for the greater rate of heat loss in the former due to the somewhat higher flow rate therethrough. The galvanometer will then come to zero.

If the amount of air flowing past the valve 48 is still further increased, the rate of heat energy liberation will become the same in the cells 11 and 13, at which time the galvanometer needle will swing to the right, since the rate of heat loss from cell 13 is greater than the rate of heat loss from cell 11, because of the somewhat higher flow rate in the former.

When the amount of auxiliary air brought in through the orifice conduit 49 is extremely small in comparison to the amount of air brought in through the main conduit 47, this change in the position of the galvanometer needle occurs with a very slight change in the adjustment of the air-regulating valve 48. The adjustment of the flow-regulating valve 48 may be employed as a measure of the percentage of combustible components in the exhaust gases being examined.

Figs. 2 and 3 illustrate one form of commercial adaptation of the invention in the nature of a compact portable gas analyzer unit, the various elements thereof being mounted within a container or box 61, preferably of sheet metal, which is provided with a handle 63 for convenience in transporting the same. The box has a hinged member 65, the outer face of which serves as an instrument panel. Apertures 67 in the wall serve for ventilation of the box.

The analyzer unit comprises an electric motor 69 mounted in rubber on a support 71 carried by the member 65. The motor is driven by power flowing thereto through electric conduit 73 controlled by switch 75. Operatively connected with the motor are two pairs of positive pressure rotary blowers or pumps 77, 79; and 81, 83;—the pumps of each pair being mounted as a unit in coacting relationship. Both pairs of pumps are of like construction, so that one pair only need be described. Pumps 77, 79 are of well known type employing an eccentrically-mounted slotted rotor with freely slidable blades cooperating with the inner surface of the pump wall. The rotor shafts of the respective pumps are interconnected. The outlet from pump 77 is in permanent communication with the fluid inlet to pump 79 through a channel open to the atmosphere through a restricted outlet 85.

A pair of combustion cells 11, 13 are formed in a unitary cell block 14, preferably of metal, which is mounted upon the member 65. The cells have their upper ends open freely to discharge gases flowing therein. Air is drawn from outside the box 61 through an opening in a member 87 forming the cover of a small filter chamber 89, adapted to be filled with cotton or the like. A conduit 91 connects the chamber 89 with the inlet of pump 77. The outlet of pump 79 is connected with the cell 11 through pipe 93 having therein a flow-regulating orifice or valve 95. It is also connected with the mixing chamber 15 through pipe 97 having therein a calibrated three-way flow-regulating valve 99 operated by means of a member 101 mounted upon the front of the box. The construction of the valve 99 is such that the total amount of gas flowing through it remains substantially constant at all times, while the relative portions of the gas issuing to the chamber 15 and that issuing to the atmosphere through air outlet 103 may be varied selectively.

A conduit 105 and flexible tube 106 connect the source of the combustion gases to be analyzed with a gas filter 107 containing cotton or other suitable filtering material. A conduit 109 leads from the outlet of filter 107 to the inlet of pump 81. The outlet from this pump is in permanent connection with the inlet of pump 83 through a passage which is in permanent restricted communication with the atmosphere through aperture 111. A conduit 113 connects the outlet of pump 83 with chamber 15.

In this modification one or more thermocouples are substituted for the Wheatstone bridge circuit previously described. The analyzer construction is shown more particularly in Fig. 6, and comprises two heating coils 115, 117 of a heat-refractory metal. Platinum or silica-coated platinum or alloy may be used, mounted within the respective cells 11, 13. The said heating coils are arranged in series in an electrical circuit 119 connected with the main conduit 73 and controlled by the switch 75.

A plurality of thermocouples 123 arranged in series are disposed within and adjacent the upper ends of the coils 115, 117, with their hot and cold junctions disposed in the respective cells. The galvanometer 125 is connected with the thermocouples in well known manner.

In the operation of the device shown in Figs. 2 and 3, the motor is placed in operation, thereby pumping a regulated flow of filtered air to the mixing chamber past the regulating valve 99, while at the same time the pumps 81, 83 draw a continuous sample of gas through conduit 105 and force the filtered gas at a substantially uniform regulated rate to the mixing chamber where it is mixed with the air flowing through valve 99. The mixed gases then are divided and flow in approximately equal amounts through the respective cells 11, 13. A small additional amount of air is concurrently added to the fluid mixture flowing within cell 13 through the valve-controlled conduit 93.

The arrangement of the heating elements and the amount of heating current flowing therethrough preferably is so selected that when air alone is flowing through the respective cells, a temperature in the range from 1400° to 1600° F. is maintained on the heated element, though temperature substantially lower or higher than these may be employed. When employed, these high temperatures accentuate the cooling effect upon the heating elements of the small increment of air added to the mixture flowing to one cell. A single movement of the switch 75 serves both to operate the motor 69 and energize the wires 115, 117 of the heater circuit.

When the excess combustibles in the gas flowing to the analyzer is more than the equivalent of the air flowing to the mixing chamber through valve 99, the temperature developed in cell 13 will tend to be higher than that in cell 11 and the galvanometer needle will move to the left from its balanced position. The operator then adjusts the valve 99 to increase the amount of air flowing to the mixing chamber 15 until sufficient air is present in the mixture to again return the galvanometer needle to the balanced position indicating combustions of substantially equal intensity in each cell. The operator then reads on the scale associated with the air-regulating valve 99 the combustion efficiency of the operation producing the gases being tested, or the readings may be made in terms of per cent of combustibles in the said gases.

If there is insufficient combustibles in the gas being examined to completely react with the air flowing to the mixing chamber through valve 99, a lower temperature will be produced in cell 13 than that in cell 11, and the galvanometer needle will be unbalanced toward the right. Again by proper manipulation of the main air valve 99 thus reducing the air flow to the mixing chamber, a point will be reached when the galvanometer again indicates balanced heat conditions within the cells 11, 13—at which time a reading on the valve scale is made. The orifice or valve 95 in the auxiliary air line after once being adjusted, is left undisturbed following the calibration of the analyzer.

In another form of the invention, illustrated in Fig. 4, an automatic direct combustion efficiency reading is secured with little or no attention on the part of the operator or manual adjustment of the instrument during the combustion efficiency determination.

Referring to Fig. 4, air is drawn to the inlet of the blower or pump 131 through an air filter 89. The said pump discharges a regulated amount of air to the mixing chamber 15, here shown as formed within a unitary orifice block 133 mounted on a panel 134, the air flowing to and within the block through a conduit 135 containing an adjustable orifice member 137. In this modification the orifices 27, 29 are within the block 133, and a pressure-limiting device 139 of well known construction mounted on the block is connected with the chamber 15.

A blower or pump 141 driven by motor 69 draws a continuous sample of the gas to be analyzed from a source thereof and thence through a conduit 145 having therein a combination wet scrubber and dry filter 143 of known type. The filtered gas is then forced through line 147 to the chamber 15 through an orifice 149. A pressure-limiting device 151 similar to device 139 is mounted on the block and communicates with conduit 147.

An air by-pass line 155, having therein an electrically-operated flow-regulating valve 157 connects the outlet of pump 131 with the inlet thereof, whereby excess pressure in the air discharge line from the pump can be adjusted as variations may occur in the air consumption during the analysis.

The arrangement of thermocouples and electric heating elements preferably is the same in this modification as in that shown in Figs. 2 and 6—with the exception that the galvanometer 125 is replaced with a galvanometer relay 159 of well known construction arranged in the electric circuit with the thermocouples 123. The relay 159 is also connected in an electric circuit with a small reversing motor 161 or its equivalent, arranged and adapted to close or open the valve 157 when energized through lead wires 163, 165, upon the flow of current through one or the other of the relay lead wires 167, 169.

The outlet of pump 131 may, if desired, be connected with a pressure gauge 153, as for example by the line 171. Such gauge when used preferably is mounted upon the face of the panel or box member 134, and is calibrated in suitable manner, as in terms of combustion efficiency. When this is done, direct calibration of the valve 157 is not necessary. A resistance element which may conveniently be an electric lamp 173 is shown as mounted on the panel 134 where it serves for illuminating the gauge 153. The lamp is arranged in the heater circuit in series with the elements 115, 117.

In the operation of the automatic instrument (Fig. 4), the movement of the needle in the galvanometer relay 159, upon the unbalancing of the heat conditions in the respective cells 11, 13, energizes the small motor 161 which then acts through suitable gearing to either close or open the valve 157, thereby regulating the amount of air circulated by the pump, and controlling the pressure and flow rate in the line 135. With this apparatus it is only necessary to connect it to the source of gas to be tested and to a source of suitable current. The apparatus automatically will adjust the valve 157 to produce a balanced heat condition within the cells 11, 13, and the air demand can be read in terms of combustion efficiency upon the pressure gauge 153, or upon a calibrated scale connected with the said valve.

Fig. 6 illustrates somewhat diagrammatically a modification of the invention in which a small additional increment of the combustible gas or gas mixture is employed instead of an increment of air or oxygen. In the form shown, the sample of gas to be examined is drawn by pump 141 through the filter 143 and thence is passed through orifice 149 to the mixing chamber 15 in the manner previously described. A second conduit 181 having therein an orifice 183 leads from the pump to conduit 19 adjacent the analyzer cell 13. No increment of auxiliary air is fed to either combustion cell.

Under certain conditions of gas concentration, the combustion normally produced within the cells 11, 13, may be explosive, especially in instances where pure oxygen is being used for the reactive fluid. Since the invention is based on the measurement of the difference in intensity of the reactions occurring in the cells 11, 13, and not upon the actual intensity,—the danger from explosive concentrations of gases may be overcome,—should such become necessary,—by diluting within the mixing chamber 15 the mixture of air or oxygen and the unknown gases by means of an inert gas such as nitrogen or carbon dioxide so as to reduce the concentration of the reactants below the explosive limit. The inert or diluent gas may be introduced into the chamber 15 through a valve-controlled conduit 200. (See Fig. 6.) While preferably the inert gas is added to the fluid mixture before dividing it at the orifices 27, 29,—it is likewise possible directly to dilute with the inert gas either the air or the gas sample being analyzed. In the latter case it is essential, however, that the instrument be calibrated for such mixtures containing inert gas.

When the waste gases being examined are very high in combustibles it is often convenient to combust all or a portion of the same by passing the gas mixture from the mixing chamber 15 through a combustion chamber, maintained at a suitable reaction temperature such as 1500°–2000° F., following which the resultant gases, preferably after at least a partial reduction in temperature, are divided and flow through cells 11, 13.

As shown in Fig. 7, a heat-insulated combustion furnace 203 of quartz or the like is located in the conduit 21 leading from the mixing chamber of Fig. 2. The furnace 203 is provided with electric heating coil 205 connected in the aforementioned heating circuit 119. The conduit 21 beyond the furnace 203 may be provided with heat radiating fins 207 or the equivalent if desired.

By burning the combustibles in the furnace, the intensity of the reactions in the combustion cells of the resultant gas mixture may be more accurately measured, without the possibility of injury to the heating elements or thermocouples by excessively high temperatures.

The invention as described is also adapted for the measurement of reactive components of fluid mixtures by the addition of fluid reactants thereto which produce endothermic instead of exothermic reactions.

The apparatus of the invention may be adapted for operation on direct current or for universal operation by using the proper motors and substituting a resistance for the transformer.

It is not essential that the heating elements within the cells 11, 13, be of catalytic material. When non-catalytic heater elements are used, the current flowing therethrough must be sufficiently high to initiate a rapid uncatalyzed reaction between the various components of the fluid mixture, as hereinbefore indicated.

Under certain conditions the cells 11, 13 may be partially or completely filled with catalytic packing material such as Hopcalite or other active oxides of like nature, which serves in place of electric heating elements for initiating combustion in the cells 11, 13.

It will be evident that the present invention has overcome many of the difficulties of the prior known methods and devices for measuring combustion efficiency by the catalytic combustion of the fluids being examined,—and that changes in the electrical energy input in the heating circuit and loss of heat from the combustion cells may vary widely, so long as the conditions remain the same in both cells 11, 13. Previous to the present invention, it has been important that the amount of electric energy employed for heating the catalytic element be maintained constant and that the loss of energy from the cell by conduction and convection remain constant at a given temperature. This necessitated that the electrical supply to the cell be constant at all times,—that the ratio of air to gas be maintained constant, and that the rate of flow of the mixture to the analyzer be constant. In such prior practices a calibrated galvanometer has been used directly to measure the variations in temperature occurring within the cell. The accuracy of the determination depended upon the galvanometers retaining its calibration, and upon freedom from deterioration of the catalytic element due to the occlusion of foreign material on its surface.

In the practice of the present invention the electrical heating supply to the cells and heat losses therefrom can vary over a wide range, since conditions are always substantially the same, or at least vary proportionately in the respective cells at all times. Furthermore, the speed of the pumps and the rate of flow of the gas mixture to the analyzer can vary substantially, since these rate changes occur simultaneously in proportional amounts in the gas streams flowing through the respective cells 11, 13 and so do not prevent the balancing of conditions within the cells. Since the galvanometer is used only to indicate a state of unbalance in the cells 11, 13, it need not retain its calibration.

The invention is susceptible of modification within the scope of the appended claims.

I claim:

1. The method of measuring the concentration of a fluid reactant in a fluid mixture which comprises mixing therewith under conditions unfavorable for reaction a regulated amount of a second fluid reactive with the former, thereby forming a fluid reactant mixture, dividing the said reactant mixture into two uniformly proportional portions, adding to one of said portions a small increment of either reactive fluid, thereafter concurrently subjecting the said fluid portions to conditions producing reactions therein, measuring the difference in the intensities of the resultant reactions in the respective fluid portions, adjusting the amount of second reactive fluid in the said fluid reactant mixture to balance the intensities of the said reactions, and measuring the amount of the second reactive fluid thus required.

2. In a method of measuring the efficiency of a combustion operation by the controlled combustion of exit gases produced thereby, the steps of combusting a flowing regulated mixture of said exit gases and a combustion-supporting gas, concurrently combusting a second flowing mixture containing the said exit gases and a slightly larger regulated proportion of combustion-supporting gas than that present in the first-named mixture and flowing at approximately the same rate as the latter, adjusting the volume of combustion-supporting gases present in each of the said mixtures undergoing combustion to balance the temperatures produced therein, and measuring the amount of combustion-supporting gas thus required.

3. The method of measuring the amount of a reactant in a gas mixture, which comprises mixing with the latter under conditions unfavorable for reaction a second reactant, dividing the resultant reactant mixture into two fixed portions, adding a small fixed increment of one of the said reactants to one of the said portions, concurrently reacting the respective portions in separate reaction zones, thereby producing heat of unequal intensity in the respective zones, adjusting the amount of the said second reactant required to balance the temperatures developed within the said zones, and measuring the amount thereof thus required.

4. The method of measuring the efficiency of a combustion operation by the controlled combustion of waste gases produced thereby, which comprises forming a regulated mixture of said gases and a combustion-supporting gas, dividing the said mixture into two uniformly proportional portions, adding a small fixed increment of a combustion element to one of the portions, concurrently effecting combustion of the respective portions under similar conditions, thereby producing temperatures in the said portions, regulating the amount of combustion-supporting gas in the said mixture to balance the heat produced in the respective portions, and measuring the amount of the combustion-supporting gas so required.

5. The method of measuring the efficiency of a combustion operation, which comprises mixing waste gases from such operation with a regulated amount of a combustion-supporting gas, separating the resultant mixture into two uniformly proportional portions, diluting one of the said portions with a small fixed increment of combustion-supporting gas, thereafter separately but concurrently passing the respective portions into contact with heated elements, thereby effecting combustion and generating heat in such portions, adjusting the amount of combustion-supporting gas added to the waste gases in the first-named mixing operation to produce heats of approximately equal intensity by the respective combustions, and measuring the amount of combustion-supporting gas thus required.

6. The method of measuring the efficiency of an internal combustion engine of the automotive type by the controlled combustion of exhaust gases produced thereby, which comprises the steps of concurrently measuring the resistance developed in an electrical conductor by heat produced by the controlled combustion of a gas mixture containing the said exhaust gases and air, and concurrently measuring the resistance developed in a second electric conductor by heat produced by the controlled combustion of a second mixture containing the first-named gas mixture and air, the air in the second mixture being present in amount slightly greater than in the first-named mixture, balancing by adjusting the amount of air in the said gas mixtures the electric resistance of the respective conductors, and measuring the amount of air required to effect such balance.

7. The method of measuring the concentration of a fluid reactant in a fluid mixture which comprises mixing therewith under conditions unfavorable for reaction a regulated amount of a second fluid reactive with the former, adding thereto a third fluid which is inert to both of the said fluids, dividing the resulting reactant mixture into uniformly proportional portions, adding to one of the said portions a small increment of one of the reactive fluids, thereafter concurrently subjecting the said fluid portions to conditions producing reactions therein, measuring the difference in the intensities of the resultant reactions in the respective fluid portions, adjusting the amount of the second reactive fluid in the said reactant fluid mixture to balance the intensities of the said reactions, and measuring the amount of the second reactive fluid thus required.

8. The method of measuring the extent of an incomplete chemical reaction, which comprises mixing a fluid product of the reaction with a regulated amount of a second fluid reactive with a component of the fluid product, thereby forming a uniform fluid mixture, reacting the fluid mixture under conditions substantially to reduce the amount of one of the reactive fluid components and to form a residual reaction mixture, dividing the residual reaction mixture into two uniformly proportional portions, adding to one of the said portions a small increment of one of the said reactive fluids, thereafter concurrently subjecting the said fluid portions to conditions producing reactions therein, measuring the difference in the intensities of the last-named reactions in the respective fluid portions, adjusting the amount of second reactive fluid in the first-named fluid mixture to balance the intensities of the said reactions, and measuring the amount of the second reactive fluid thus required.

9. In combination, means for continuously forming a regulated mixture of combustible gases and a combustion-supporting gas, means adapted to divide the said mixture into two uniformly proportional portions, means for modifying one of the said portions by adding thereto a small fixed increment of combustion-supporting gas, two combustion cells, means for separately conducting the respective modified and unmodified portions to corresponding cells, a plurality of means connected in series within the respective cells and adapted when heated to produce opposing electromotive forces, means for indicating the direction of the resultant electromotive force developed in the cells, and calibrated means for regulating and measuring the combustion-supporting gas flowing to the first-named mixing means.

10. In apparatus for measuring the concentration of a reactive component of a fluid, the combination which comprises two reaction cells, means for mixing the said fluid with a regulated amount of a fluid reactant, means for continuously dividing the resultant mixture into two uniformly proportioned portions, means for modifying one of the portions by mixing therewith a small fixed increment of the said reactant, means directing each of the respective modified and unmodified portions through a corresponding one of the cells, means for indicating any difference in temperatures developed in the two cells, and means operably connected to and controlled by said temperature indicating means for controlling and metering the delivery of fluid reactant to the first named mixing means.

11. In combination, a Wheatstone bridge circuit having a source of electric potential, a galvanometer and two catalytic elements, a separate combustion cell enclosing each of the respective catalytic elements, mixing means for continuously forming a regulated mixture of a gas being examined for combustible and a combustion-supporting gas, means for regulating and measuring the supply of combustion-supporting gas to said mixing means, means for separating the said mixture into two uniformly proportional portions, means for adding to one of the said portions a small fixed increment of combustion-supporting gas, and means for concurrently flowing the said portions through the corresponding cells.

12. In apparatus for measuring the concentration of a reactive component of a fluid, the combination which comprises two reaction cells, heating means within the cells, means for mixing the said fluid with a regulated amount of a fluid reactant, means for continuously separating the resultant mixture into constantly proportional portions, means for mixing with one of the portions a small fixed increment of the said reactant, means directing each of the respective portions through a corresponding one of the cells, interconnected means in the said cells for producing an electromotive force dependent upon the resultant of the temperatures developed in the respective cells, and automatic means operatively connected to the last named means and operatively responsive to the resultant electromotive force produced thereby, for controlling and measuring the delivery of the fluid reactant to the first named mixing means.

13. The method of measuring the concentration of a fluid reactant in a fluid mixture which comprises mixing therewith under conditions unfavorable for reaction a regulated amount of a second fluid reactive with the former, dividing the resulting reaction mixture into two uniformly proportional portions, adding to one of said portions a small fixed increment of a fluid reactive with one of said first named fluids, thereafter concurrently subjecting the said fluid portions to similar conditions producing reaction therein, producing opposed electromotive forces varying respectively in response to variations in the intensity of reaction in the respective portions, noting the direction of the resultant electromotive force, adjusting the amount of second reactive fluid in the reaction mixture to balance the intensities of the said reactions, and measuring the amount of the second reactive fluid thus required.

14. In apparatus for measuring the amount of a combustion element in a fluid, the combination of mixing means for mixing with said fluid a second fluid combustion element reactive with the former, means for dividing the resulting mixture into two uniformly proportional portions, a device for modifying one of the said portions by introducing thereto a small fixed increment of a combustion element adapted to react with one of said first named combustion elements, means for regulating and measuring the second combustion element flowing to the first named mixing means, two reaction cells, means for directing the said modified portion through one cell, means for directing the unmodified portion through the other cell, and means for indicating any difference in temperatures developed in the two cells.

15. The method of measuring the concentration of a combustion element in a fluid which comprises, mixing therewith a measured amount of a second element of combustion reactive with said first element under conditions different than those obtaining when the elements are mixed, dividing said mixture into two uniformly proportional portions, adding to one of said portions a small increment of a combustion element, concurrently effecting combustion of the respective portions under similar conditions thereby producing heat in the said portions, regulating the amount of the second element of combustion in the said mixture to balance the temperatures produced in the respective portions, and measuring the amount of the second element of combustion so required.

BENJAMIN MILLER.